July 8, 1958 W. H. TANKE ET AL 2,842,040
DRAFT MEANS AND DEPTH CONTROL FOR GROUND WORKING IMPLEMENTS
Filed July 15, 1947 4 Sheets-Sheet 1
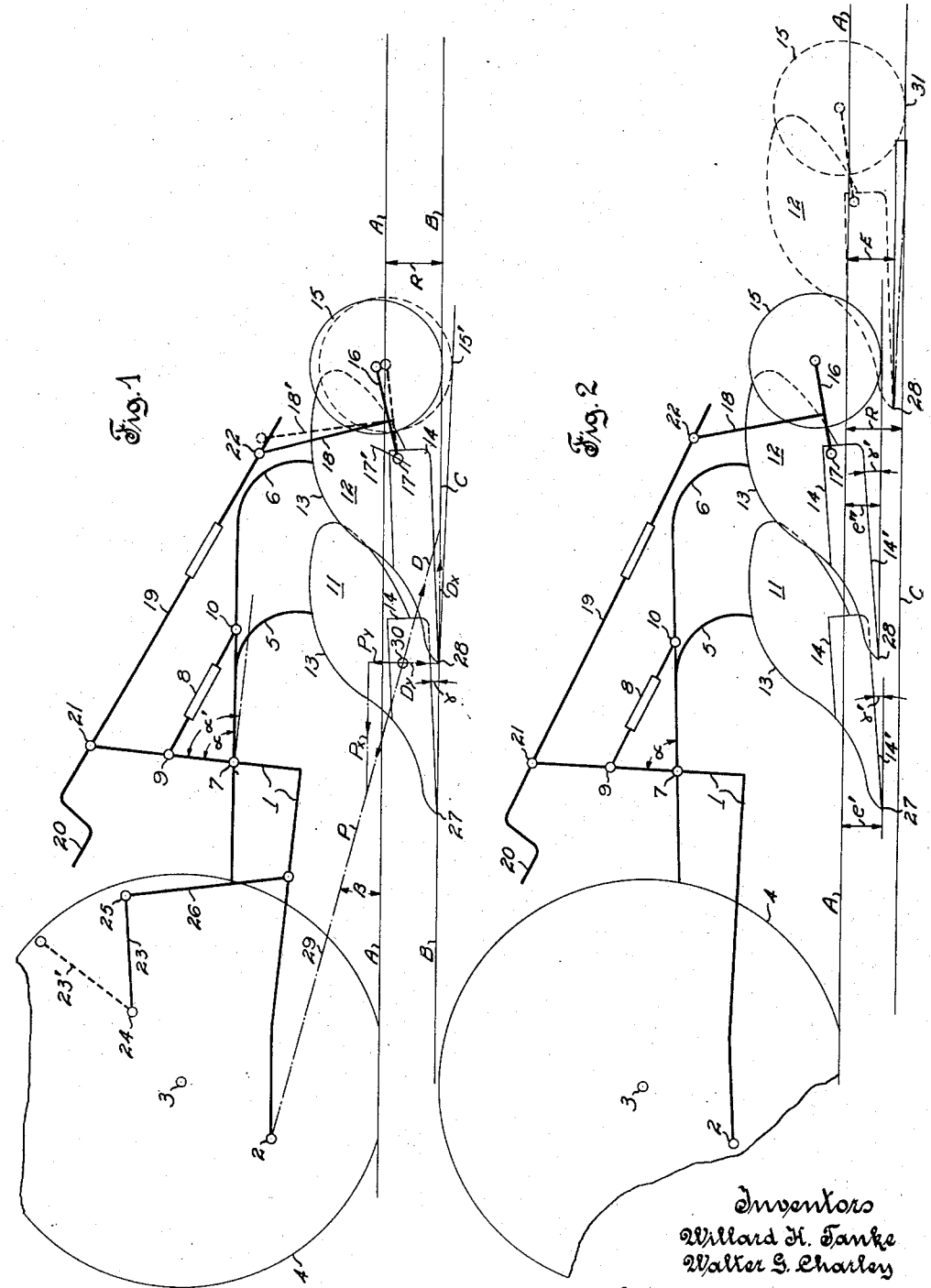
Inventors
Willard H. Tanke
Walter G. Charley
by Kimball L. Wyman
Attorney

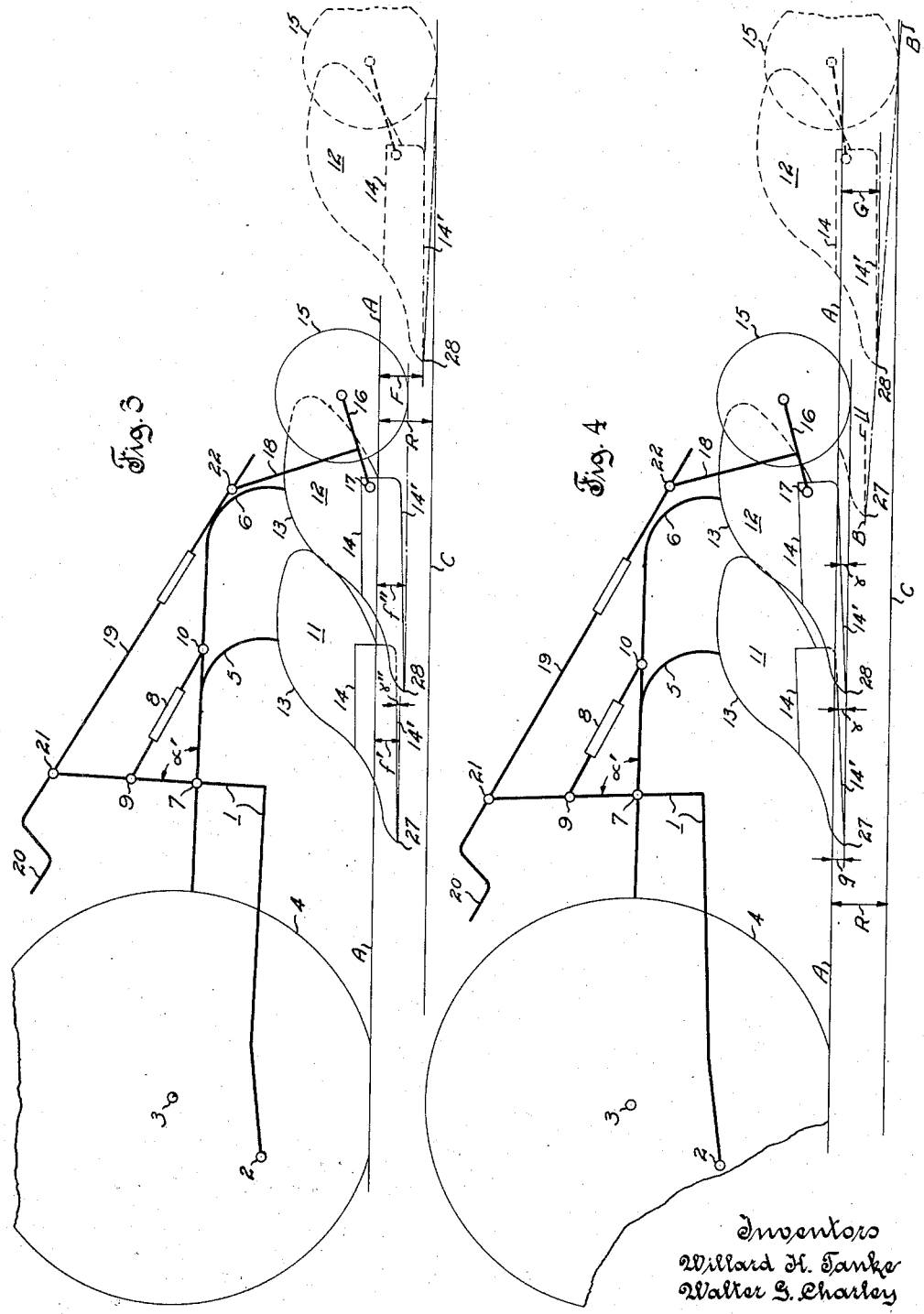

July 8, 1958 W. H. TANKE ET AL 2,842,040
DRAFT MEANS AND DEPTH CONTROL FOR GROUND WORKING IMPLEMENTS
Filed July 15, 1947 4 Sheets-Sheet 3

Inventors
Willard H. Tanke
Walter G. Charley
by Kimball A. Wyman
Attorney

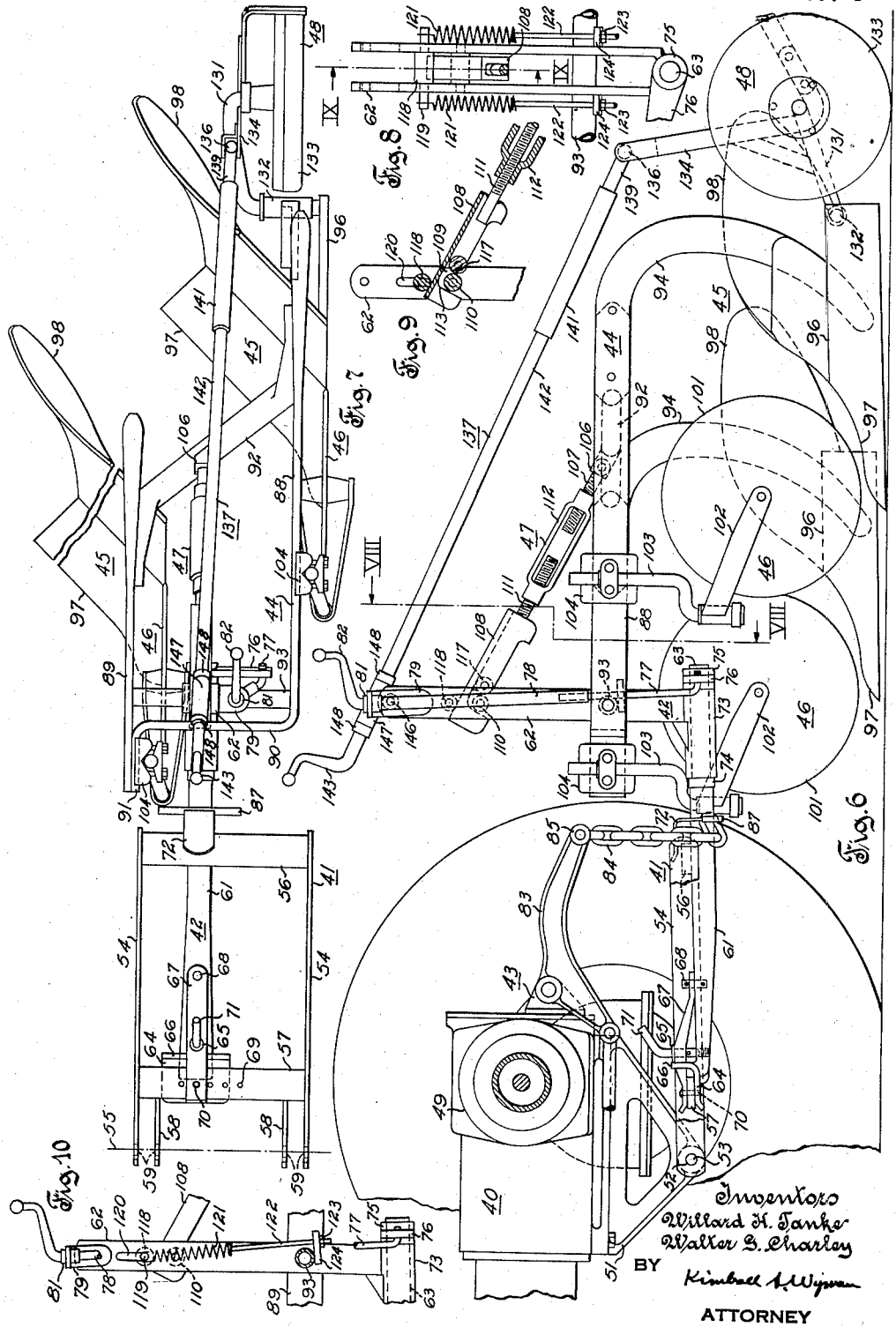

United States Patent Office 2,842,040
Patented July 8, 1958

2,842,040

DRAFT MEANS AND DEPTH CONTROL FOR GROUND WORKING IMPLEMENTS

Willard H. Tanke, La Crosse, Wis., and Walter G. Charley, La Cresent, Minn., assignors to Allis-Chalmers Manufacturing Company, Milwaukee, Wis., a corporation of Delaware Application July 15, 1947, Serial No. 760,958

33 Claims. (Cl. 97—47.54)

This invention relates generally to an agricultural implement of the type provided with one or more tools carried by a part thereof and also to a draft means suitable for connecting the above mentioned and other types of agricultural implements to a traveling support.

This invention is directed toward and contemplates an improved construction for an agricultural implement of the type adapted to be hitched to and drawn behind any form of traveling support, such as a tractor or the like, and a draft structure of the type adapted to be carried by a traveling support having a traveling device detachably connected thereto.

More particularly one phase of the present invention is concerned with an implement of this type having draft means securable to a traveling support for up and down movement relative thereto and having a tool support operatively connected with the draft means for movement relative thereto. And one of the objects of this phase of the invention is to provide an improved combination and coaction of parts comprising a coupling means uniting the draft means and tool support for up and down swinging movement in a manner affording ready adjustment of the beaming angle (that is, the vertical angle between the coupling post or a similar upright member and the implement support), and comprising a gauge element and means operatively uniting the gauge element, tool support and draft means in a manner affording up and down adjustment of the gauge element relative to the implement support independent of the adjustment of the beaming angle.

Another object of this phase of the invention is to provide an improved combination and coaction of parts comprising a coupling means uniting the draft means and tool support, and including as parts thereof, a releasable lock affording movement of the tool to an elevated and inoperative position in response to contact with an immovable obstacle such as a rock or the like.

A further object of this phase of the invention is to provide an improved combination including as parts thereof a coupling means uniting the draft means and tool support for up and down swinging movement in a manner affording ready adjustment of the beaming angle, a releasable lock affording movement of the tool to an elevated and inoperative position in response to contact with an immovable obstacle, and means for securing the draft means against downward movement upon upward movement of the tool.

It is also an object of this phase of the invention to provide an implement structure having parts including a drawbar, a draft pole and a tool support constructed and combined for coaction, particularly with respect to the tool support and draft pole, in a novel and improved manner providing a simplified and durable structure and affording ready angular adjustment of the tool support about the longitudinal axis of the draft pole for maintaining the tool support level with the ground.

Another one of the objects of this phase of the invention is to provide an improved combination and coaction of parts comprising a coupling means uniting the draft means and tool support, a depth regulating or gauge element, and means operatively uniting the gauge element with the draft means and tool support in a manner affording up and down adjustment of the gauge element relative to the implement support in response to an adjustment of the beaming angle.

It is also an object of this phase of the invention to provide an improved implement comprising a drawbar structure, a draft structure, tool support, coupling means, tool, gauge element and control means therefor, combined for coaction in a novel manner to determine the maximum working depth by a balance of the vertical components of the pulling force exerted by the traveling support and the force resulting from the weight of the implement structure and the soil resistance, and maintaining a balance of these vertical components of forces at a lesser depth by adjustment of the gauge wheel.

The other phase of this invention is concerned with a drawbar and draft structure of the type adapted to be carried by a traveling support such as a tractor or the like, and having a trailing agricultural implement, vehicle or other device detachably connected thereto.

More particularly this phase of the invention is directed toward and contemplates the provision of an improved drawbar and draft structure embodying novel features of construction and including combinations and subcombinations of elements comprising a frame structure, draft pole and coupling post affording lateral swinging motion of the draft pole and also vertical movement of the frame structure and draft pole in unison.

Another object of the invention is to provide an improved draft structure incorporating novel and practical features of construction and coaction as applied to a coupling post and draft pole combination affording circumferential movement of the coupling post about a longitudinal axis of the draft pole for effecting leveling of the trailing device.

Apparatus constructed in accordance with this invention will afford results and advantages which will become readily apparent as the disclosure progresses and points out additional objects, advantages and features of construction considered of special importance and in some instances of general application although shown and described as applied to a 2-bottom plow. And accordingly the present invention may be considered as comprising those features of construction and/or combinations and subcombinations of various elements as more particularly set forth in the appended claims and in the detailed description reference being had to the accompanying drawings illustrating one embodiment of the invention, and in which, Fig. 1 shows schematically a combination and coaction of parts of a tractor drawn 2-bottom plow when operating at a maximum depth with a correct beaming adjustment wherein the plows assume a "floating" position;

Fig. 2 is a schematic drawing of the plow in Fig. 1 having the same beaming adjustment and showing the effect of lowering the gauge wheel on the working depth by the plow;

Fig. 3 is a schematic drawing of the plow in Fig. 1 with the same adjustment of the gauge wheel, but with an increase in beaming angle;

Fig. 4 is a schematic drawing of the plow in Fig. 1 with both the gauge wheel and beaming angle adjusted as shown in Figs. 2 and 3;

Fig. 6 is a partial left side view of the tractor drawn plow shown in Fig. 5 with the major portion of the rear of the tractor cut away, the near side member of the drawbar structure cut away, and the tension spring assembly on the coupling post omitted to expose details of the structure;

Fig. 7 is a top view of the structure shown in Fig. 6 with the rear portion of the tractor, the drawbar and the tension springs on the coupling post omitted for sake of clarity;

Fig. 8 is a view, taken generally on line VIII—VIII of Fig. 6, of the releasable lock connection with the coupling member omitting the connection of the screw rod and winging adjustment rod at the upper end of the coupling post for sake of clarity;

Fig. 9 is a side view of the releasable lock connection, taken generally on line IX–IX of Fig. 8, with the near side portion of the coupling post omitted to better show the connection and coaction of parts;

Fig. 10 is a side view of the vertical coupling post omitting a portion of the winging adjustment rod so as to more clearly show the tension springs.

Figures 5, 11:
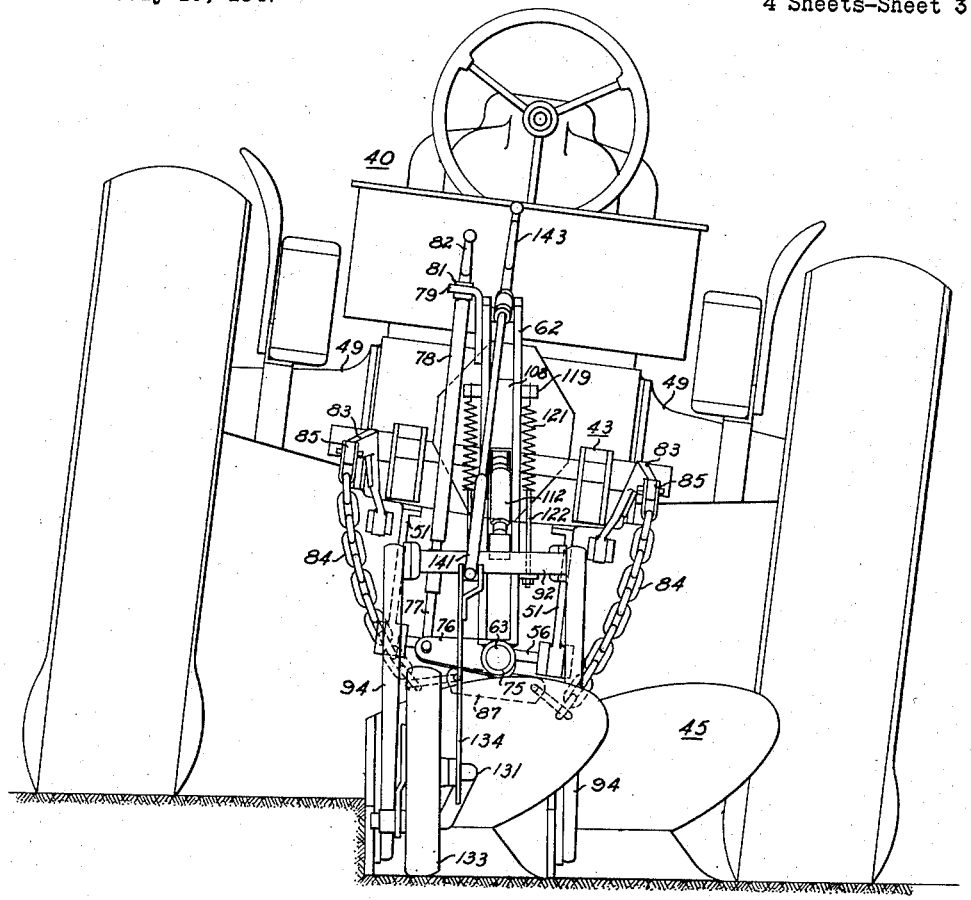
Fig. 5 is a rear view of a tractor drawn 2-bottom plow embodying the invention herein disclosed.
Fig. 11 is a left side view of the tractor drawn plow shown in Fig. 5 and indicating the break back action of the plow upon striking an obstacle.

Referring to Fig. 1, the heavy, generally L-shaped line 1 indicates schematically a rigid draft assembly comprising a drawbar of the tractor, a draft pole of the plow and a coupling post on the draft pole. Draft assembly 1 is hitched to the tractor for free vertical swinging movement about a pivot axis 2 which may be termed a first transverse pivot axis and is located on the tractor (not shown in Fig. 1) at fixed horizontal and vertical distances below and forwardly of the rear wheel axis 3 of the tractor, one of the rear wheels of the tractor being indicated at 4.

The plow frame comprising beams 5 and 6 is connected with the coupling post of draft assembly 1 by a pivot joint indicated at 7 and by a turnbuckle brace 8 between points 9 and 10 on the coupling post and on the plow frame, respectively. Turnbuckle brace 8 retains the plow frame against pivotal movement about the axis of pivot joint 7 and by lengthening or shortening turnbuckle brace 8 the angular position of the plow frame relative to the draft assembly indicated by the beaming angle $\alpha$, may be adjusted. A forward plow bottom 11 and rearward plow bottom 12 are rigidly secured to plow beams 5 and 6 respectively, each plow bottom comprising a share and moldboard 13 and a landside 14.

A wheel 15 adapted to run in the furrow formed by plow bottom 12 is swingably mounted on the plow frame by means of a rigid part 16 which is mounted at its forward end in a suitable bearing (not shown in Fig. 1) on the plow frame for vertical swinging movement about an axis indicated at 17 which may be termed a second transverse pivot axis, the wheel 15 being rotatably mounted on the rear end of part 16. Rigidly secured to part 16 is an upwardly extending arm 18 for rocking part 16 about its pivot axis 17 through a suitable connection with a screw rod 19 provided with a crank handle end 20. Screw rod 19 is supported on the upper end of the coupling post by means of a swivel block which is pivoted on the coupling post at 21 and an internally threaded sleeve cooperating with the threaded portion of the screw rod is pivoted at 22 on the free end of arm 18. Suitable stop collars on screw rod 19 (not shown in Fig. 1) cooperate with the swivel block on the coupling post to prevent axial displacement of the screw rod relative to the coupling post and screw rod 19 is, therefore, effective to retain part 16 against up and down movement about its pivot axis 17. Rotation of screw rod 19 by means of crank 20 in one direction causes downward movement of wheel 15 relative to plow bottoms 11 and 12 and rotation of screw rod 19 in the other direction causes upward movement of wheel 15 relative to the plow bottoms.

It should be noted that pivot center 17 of the part 16 moves on an arc 17' about pivot center 7 when turnbuckle brace 8 is extended or contracted for the purpose of adjusting the beaming angle $\alpha$, and that the spacing of pivot center 17 from pivot center 21 of screw rod 19 changes due to such adjustment. The spacing between the pivot centers 21 and 22 can be changed only by rotation of screw rod 19 and if turnbuckle brace 8 is extended or contracted while the pivot centers 21 and 22 are kept at a fixed spacing from each other by screw rod 19 the position of wheel 15 relative to the plow bottoms will be affected by such extension or contraction of turnbuckle brace 8. Obviously if turnbuckle brace 8 is extended while the pivot centers 21 and 22 are kept at a fixed spacing from each other by screw rod 19, wheel 15 will be raised relative to the plow bottoms and if turnbuckle brace 8 is contracted while the pivot centers 21 and 22 are kept at a fixed spacing from each other by screw rod 19, wheel 15 will be lowered relative to the plow bottoms.

A one-way lift mechanism mounted on the tractor comprises a rock arm 23 which has a pivot center 24 on the tractor and the draft assembly which is operatively connected with the free end 25 of the rock arm so that upward swinging movement of the rock arm 23 will be transmitted to draft assembly 1. When the tractor advances irregularities of the ground may cause its body to rock about the rear wheel axis 3 and it is desirable that the plow be affected as little as possible by such rocking movements. Accordingly, the lift mechanism is so constructed that rocking movement of the tractor body about rear wheel axis 3 while the plow is in the ground will not be transmitted through the lift mechanism to draft assembly 1 and for that purpose a chain connection 26 may be employed between the free end 25 of rock arm 23 and draft assembly 1. Such chain connection will be slack when the plow is in its working position and when arm 23 is swung upwardly to raise the plow it will first take up the slack of the chain and then transmit lifting power to the draft assembly.

The position to which arm 23 may be moved in order to raise the plow to a transport position affording proper clearance below the plow bottoms is indicated by the dotted line 23' in Fig. 1 and when arm 23 is moved downwardly from said dotted line position the entire attachment unit comprising draft assembly 1, plow frame and parts associated therewith will swing downwardly under its own weight about hitch axis 2. Assuming that the plow frame and the draft assembly are adjusted to the relative angular position indicated by the angle $\alpha$ in Fig. 1 and that wheel 15 is adjusted relative to the plow bottoms to the position shown in Fig. 1 it should be obvious that with the tractor stationary a downward movement of arm 23 will result in the point 27 of the forward plow bottom shaft engaging the ground indicated by the line A—A. Continued downward movement of arm 23 to its full line position will then slacken chain 26 to a sufficient extent so that it will not become tight as the tractor moves forward and causes the attachment unit to move forward and downward to the furrow-turning position shown in Fig. 1. When rock arm 23 is moved from its dotted to its full line position with the tractor stationary, part of the weight of the attachment unit will be sustained by the tractor at the hitch axis 2 while the remainder which may be referred to as the unsupported weight of the attachment unit will tend to force the plow into the ground. In addition to the unsupported weight of the attachment unit the weight of the soil lifted by the plow bottoms as the tractor moves forward tends to force the plow deeper into the ground.

Under the combined effect of the unsupported weight of the attachment unit and of the weight of the soil to be lifted, downward swinging movement of the attachment unit about the hitch axis 2 continues as the tractor moves forward until wheel 15 contacts the sole of the furrow formed by the rearward plow bottom 12. Wheel 15 as shown in Fig. 1 is adjusted relative to the plow frame to such a position that the lowest point of its circumference lies in a generally horizontal plane common to points 27 and 28 of the forward and rearward plow bottoms, this plane being indicated by the line B—B in Fig. 1. When the attachment unit is lowered from its transport position as referred to hereinbefore by pivotal moment about the hitch axis 2, plow points 27 and 28 gradually move into parallelism with the ground level A—A at a depth indicated by plane B—B. However, before such parallelism is reached, the lowest point on the periphery of wheel 15 is always somewhat above the sole of the furrow formed by rearward plow bottom 12 and consequently this wheel does not impede downward swinging movement of the attachment unit about hitch axis 2 until plow points 27, 28 and the lowest point on the periphery of wheel 15 have moved to the same distance below the ground level and lie in a common plane B—B in parallelism with the ground level A—A. In that event, the lowest point on the periphery of wheel 15 contacts the sole C of the furrow formed by rearward plow bottom 12 and continued downward swinging movement of the attachment unit about hitch axis 2 will be positively prevented by contact of wheel 15 with the furrow sole formed by plow bottom 12.

The pull of the tractor which is transmitted to plow bottoms 11 and 12 when plowing at the furrow depth R, indicated in Fig. 1 is virtually effective on a line of draft 29 which is shown in Fig. 1 as extending through the hitch axis 2 on the tractor and through a point 30, the assumed location being based on empirical knowledge representing the center of resistance of the plow. Referring to the force diagrams shown in Fig. 1 at the center of resistance 30, P denotes the pull of the tractor which must be exerted in order to advance the plow and D denotes the draft of the attachment unit which may be defined as the total of all external forces including the force of gravity which, with the exception of the pull, are effective upon the attachment unit in plowing position at any given movement of its advance movement by the tractor. The vertical component $Py$ of the pull P represents a force which tends to swing the entire attachment unit upwardly about the hitch axis 2 and the vertical component $Dy$ of the draft represents a force resulting mainly from the above mentioned unsupported weight of the attachment unit and from the weight of the soil bearing upon the moldboards which tends to swing the entire attachment unit downwardly about hitch axis 2.

Assuming for a moment that wheel 15 is omitted, it will be seen that after the plow points have entered the ground by downward swinging movement of the attachment unit about hitch axis 2, and while the tractor advances, downward swinging movement of the attachment unit about hitch axis 2 will continue as long as $Dy$ is greater than $Py$. Initially, that is, when plow points 27 and 28 are at a relatively short distance below the ground level, the pull is light and $Py$ is small, while $Dy$, due to the inherent magnitude of the unsupported weight of the attachment unit, is relatively large. However, as downward swinging movement of the attachment unit about hitch axis 2 continues, the pull P increases substantially in proportion to the increase of the furrow depth while relatively little weight is added to the unsupported weight of the attachment unit by the increasing weight of the furrow slices bearing upon the moldboards. In other words, the vertical component $Py$ of the pull increases at a faster rate than the vertical component $Dy$ of the draft, as the attachment unit swings downwardly about hitch axis 2, and when the vertical component $Py$ becomes equal, in magnitude, to the vertical component $Dy$, the lifting force represented by $Py$ and the downward force represented by $Dy$ will balance each other. Depending on the condition of the soil and other factors which will be discussed hereinbelow, this condition will arise upon downward swinging movement of the attachment unit about the hitch axis 2 to a greater or lesser extent. If the soil is hard and dry the pull P obviously increases at a faster rate in proportion to the furrow depth than if the soil is loose and sandy, and when the plow is operated in hard and dry soil the vertical component of the draft will become balanced by the vertical component of the pull at a relatively shallow furrow depth, while the same condition will arise at a relatively deep furrow depth when the plow is operated in loose and sandy soil.

Furthermore, if hitch axis is located relatively close to the ground level, and the horizontal spacing of the center of resistance 30 from a vertical plane through hitch axis 2 is relatively large, the draft angle, that is, the angle $\beta$ between the line of draft 29 and the horizontal, will be relatively small; and if hitch axis 2 is located relatively high above the ground level and the horizontal spacing of the center of resistance 30 from a vertical plane through hitch axis 2 is relatively small, the draft angle will be relatively large. Obviously, the furrow depth at which the vertical component of the draft becomes balanced by the vertical component of the pull will be relatively great when the hitch connection between the plow and tractor is so constructed as to afford a relatively small draft angle, and the vertical components of the pull and draft will become balanced at a relatively shallow furrow depth when the hitch connection is constructed to afford a relatively large draft angle, provided that the total weight of the attachment unit is the same in both cases.

With the foregoing considerations in mind it may be assumed that the mentioned condition of balance between the vertical components of the pull and draft exists with reference to the plow shown in Fig. 1 while the plow is being advanced in the working position in which it is shown in this figure. As a result of the mentioned balance condition, the attachment unit has no tendency to swing either upwardly or downwardly about hitch axis 2 from the position in which it is shown in Fig. 1 and no sustaining force such as might be introduced by adjusting wheel 15 to bear with greater force upon furrow sole C is required in order to maintain the plow at furrow depth R. However, should the vertical component of pull become overbalanced by the vertical component of the draft as may be expected to occur temporarily in actual field operation the unbalanced portion of the vertical component of the draft will have to be compensated by the oppositely acting vertical reaction of wheel 15 upon furrow sole C in order to prevent an increase in furrow depth.

The position of wheel 15 relative to the plow frame as shown in Fig. 1 is such that the lowest point of its periphery lies in a common plane B—B with the plow points 27 and 28 as has been mentioned hereinbefore. Manipulation of screw rod 19 so as to raise wheel 15 above the plane B—B while the vertical components of the pull and draft are balanced has no tendency to change the plowing depth R as will be obvious from the foregoing explanations. However, if wheel 15 should be adjusted by manipulation of screw rod 19 so that the wheel tends to move downward to a position below the plane B—B for instance to the position indicated by the dotted lines 15' and 18' in Fig. 1 and if such adjustment is made when the tractor is stationary with the plow position as shown in Fig. 1, the rigidly united parts 16 and 18 will move upwardly in a clockwise direction about the axis of wheel 15 and effect an upward pivotal movement of the plow bottoms about the hitch axis 2 which in turn causes wheel 15 to bear with greater force on furrow sole C thereby reducing the effect of vertical draft component $Dy$.

The new position at which rearward plow bottom 12 would move relative to the sole C of the previously cut furrow of depth R in Fig. 1 by the above mentioned adjustment of wheel 15 is indicated in dotted lines in Fig. 2. In this position wheel 15 presses against furrow sole C at point 31 and point 28 of rearward plow bottom 12 is raised above furrow sole C to a position spaced from the ground level A—A a distance E which is shorter than the depth R of the previously cut furrow. When the tractor is advanced with rearward plow bottom 12 in the dotted line position shown in Fig. 2 plow bottom 12 will initially cut a furrow of the depth E and wheel 15 will ride up on the sole of the newly cut furrow. In this position wheel 15 may also press against the sole of the newly cut furrow with a force such that the vertical component of pull still overbalances the oppositely acting vertical component of draft as modified by the force with which wheel 15 presses against the sole of the furrow and if such is the case continued forward movement of the tractor will cause the attachment unit to be swung about hitch axis 2 higher and higher until the decreasing vertical component of pull equals the modified vertical component of draft whereupon plow point 28 and the lowest point on the periphery of wheel 15 will lie in a common plane parallel with the ground level A—A. The elevation to which the plow will rise in this manner is indicated by the full line position of the plow shown in Fig. 2, and it will be noted that as a result of the mentioned downward adjustment of wheel 15 relative to the plow frame the plow will be caused to run at a shallower depth than furrow depth R, forward plow bottom 11 forming a furrow of the depth $e'$ and rearward plow bottom 12 forming a furrow of the depth $e''$ which is somewhat less than the depth $e'$. It will also be noted that in the full line position of the plow shown in Fig. 2 the angle $\gamma'$ between the bottom edge 14' of each landside 14 and the horizontal, which angle may be referred to as the suction angle of the plow, is larger than the corresponding suction angle $\gamma$ in Fig. 1.

If wheel 15 is adjusted upwardly relative to the plow frame by manipulation of screw rod 19 while the plow is being advanced in the full line position shown in Fig. 2, the plow will respond quickly to the downward pressure represented by the unbalanced portion of the vertical component of the draft, and the furrow depth will increase. However, the furrow depth cannot be increased beyond the distance R by manipulation of screw rod 19 because, as explained hereinbefore, the plow will not penetrate the soil to a greater depth than that at which the vertical component of the draft is balanced by the vertical component of the pull, and which depth has been assumed to be depth R shown in Figs. 1 and 2.

Referring again to Fig. 1, the angular position of the plow frame relative to the draft assembly 1, represented by the beaming angle $\alpha$, may be adjusted by manipulation of turnbuckle brace 8, as has been explained hereinbefore. If turnbuckle brace 8 is extended when the tractor is stationary with the plow positioned as shown in Fig. 1, draft assembly 1 and the plow frame will jack-knife about the axis of the pivot joint 7, that is, the plow frame may move relative to the draft assembly until the plow bottoms press firmly against furrow sole C whereupon the continued extension of brace 8 operates to cause the plow frame and draft assembly to pivot as a unit in a counter clockwise direction about hitch axis 2. These movements may occur simultaneously and in either case the result is that the pivot joint 7 is forced upwardly while wheel 15 rolls a short distance forwardly on furrow sole C and also moves upwardly relative to the plow frame. This last mentioned movement of the wheel resulting from the movement of rod 19 as has been explained hereinbefore. However, the upward movement of the wheel relative to the plow frame is relatively small (see Fig. 1) for an adjustment of the angle between plow frame and draft assembly, termed the beaming angle, from the angle $\alpha$ to the angle $\alpha'$.

The new position at which wheel 15 is moved relative to rearward plow bottom 12 and the new position at which rearward plow bottom 12 is moved relative to the previously cut furrow sole C by increasing the beaming angle $\alpha$ in Fig. 1 to the beaming angle $\alpha'$ without changing the relative spacing of the pivot points 21, 22, is indicated in dotted lines in Fig. 3. It will be noted that in this position of the rearward plow bottom point 28 is spaced from the ground level A—A a distance F which is shorter than the depth R of the previously cut furrow and that the bottom edge 14' is practically parallel to the ground level A—A. If rearward plow bottom 12 (when positioned as indicated by the dotted line position in Fig. 3) is advanced by forward movement of the tractor, the rearward plow bottom first cuts a new furrow of the depth F; wheel 15 then rides up on the sole of the new furrow with the result that plow point 28 is raised still higher; and the plow will continue to rise upon continued forward movement of the tractor until as previously pointed out the vertical component of pull equals the vertical component of draft as modified by the force with which the wheel presses against the sole of the furrow. When this condition exists plow point 28 and the lowest point on the periphery on wheel 15 lie in a common plane parallel with the ground level A—A. The elevation to which the plow will rise in this manner is indicated by the full line position of the plow shown in Fig. 3, and it will be noted that as a result of the above mentioned turnbuckle adjustment, independently of adjustment of screw rod 19, whereby the beaming angle $\alpha$ is increased to the beaming angle $\alpha'$, the plow will be caused to run at a shallower depth of soil penetration, forward plow bottom 11 forming a furrow of the depth $f'$, and rearward plow bottom 12 forming a furrow of the depth $f''$, as indicated in Fig. 3. The furrow depth $f'$ is somewhat less than the furrow depth $f''$, and the suction angle $\gamma''$ is somewhat smaller than the corresponding suction angle $\gamma$ in Fig. 1.

As previously explained, the vertical component of draft must be considered to overbalance the vertical component of pull when the plow is operated at a furrow depth which is shallower than the furrow depth R. It will, therefore, be apparent that when the plow is advanced in the full line position in which it is shown in Fig. 3, the vertical component of draft will again overbalance the vertical component of the pull. The sustaining force required to compensate for the unbalanced portion of the vertical component of draft will be furnished in part by the vertical pressure of the plow upon the ground and it will be noted that in view of the relatively small suction angle $\gamma''$ (see Fig. 3) a certain portion of the bottom area of the landsides and of the shares also reacts upon the furrow soles to increase this part of the sustaining force. The remainder of the sustaining force is furnished by the reaction of wheel 15 upon the sole of the furrow formed by rearward plow bottom 12. However, increased friction losses will be incurred due to the fact that suction angle $\gamma''$ in Fig. 3 is smaller than suction angle $\gamma$ in Fig. 1.

Referring to Fig. 4, draft assembly 1 and the plow frame are shown in full lines at a beaming angle $\alpha'$ relative to each other which is the same beaming angle at which the draft assembly and plow frame are shown relative to each other in Fig. 3. The relative spacing of pivot centers 21 and 22 in the full line position of the plow shown in Fig. 4 is the same as the relative spacing at which pivot centers 21 and 22 are shown in Fig. 2. The line C in Fig. 4 indicates the same furrow sole as the line C in Fig. 1, that is, the sole of the furrow which would be formed by rearward plow bottom 12 if the plow were advanced in the full line position in which it is shown in Fig. 1.

The dotted line position of plow bottoms 11 and 12 and of wheel 15, indicated in Fig. 4, shows how wheel 15 would be located relative to the plow bottoms and how the plow bottoms would be located relative to the ground level A—A, if both of the mentioned adjustments which have been discussed separately hereinbefore in connection with Figs. 2 and 3, were made after the tractor has been stopped with the attachment unit in the full line position in which it is shown in Fig. 1. From a comparison of Fig. 4 with Figs. 1, 2, and 3 it will first be noted that in Fig. 4 the lowest point on the periphery of wheel 15 lies in a common plane with plow points 27 and 28, which plane is indicated by the line B—B. As distinguished from Fig. 1, the line B—B in Fig. 4 is inclined relative to the horizontal, whereas in Fig. 1 the plane represented by the line B—B is parallel to the horizontal and coincides with the furrow sole C. Point 28 of the rearward plow bottom, in the dotted line position of the latter shown in Fig. 4, is spaced from the ground level A—A a distance G which is smaller than furrow depth R and also smaller than the distances E and F in Figs. 2 and 3, respectively. If plow bottoms 11 and 12, in the dotted line position shown in Fig. 4, are advanced by forward movement of the tractor, plow bottom 12 first forms a new furrow of the depth G, and wheel 15 then rides on the sole of the newly formed furrow. Upward movement of wheel 15 to the higher level of the new furrow sole causes the attachment unit to swing upwardly about hitch axis 2, and as a result, plow point 28 is raised still higher. The plane indicated by the line B—B is thus moved to a smaller angle relative to the horizontal, and as the tractor advances wheel 15 will continue to rise until the plane represented by the line B—B becomes parallel with the ground level A—A. The final position at which the attachment unit will arrive due to the gradual rise of wheel 15 is shown in full lines in Fig. 4.

It will be seen that the combined effect of the adjustments discussed separately hereinbefore in connection with Figs. 2 and 3, would cause the plow to run at a relatively shallow depth of soil penetration as indicated by the distance $g$ in Fig. 4. When the plow in its full line position shown in Fig. 4 is advanced by forward movement of the tractor, the depth of the furrow formed by the forward plow bottom is the same as the depth of the furrow formed by the rearward plow bottom, and the suction angle $\gamma$ is the same as in Fig. 1. In this respect the combined effect of the screw rod and turnbuckle adjustments is different from the individual effects of these adjustments which have been explained hereinbefore in connection with Figs. 2 and 3. Referring to Fig. 2, it will be observed that when wheel 15 is adjusted downwardly from the position in which it is shown in Fig. 1 by manipulation of screw rod 19 while draft assembly 1 and the plow frame are kept at the beaming angle $\alpha$ shown in Fig. 1, such adjustment of only the wheel 15 causes the plow to gradually adjust itself to a relatively shallower depth of soil penetration, but when it has reached its final position as shown in full lines in Fig. 2, the forward plow bottom 11 cuts a furrow of greater depth than the rearward plow bottom. And as a result the thicker furrow slice is turned over onto the thinner slice thereby producing ridges at unequal height and gives the appearance of a poor job of plowing.

In the full line portion shown in Fig. 2, the plow would further operate at a suction angle $\gamma'$ which is somewhat greater than suction angle $\gamma$ in Fig. 1, and this increase of suction angle would be undesirable if it be assumed that suction angle $\gamma$ shown in Fig. 1 is the best for satisfactory operation of the plow. On the other hand, referring to Fig. 3, it will be observed that when the beaming angle is increased from angle $\alpha$ shown in Fig. 1 to the angle $\alpha'$ shown in Fig. 3 by manipulation of turnbuckle 8 while pivot centers 21 and 22 are maintained by screw rod 19 at the same relative spacing at which they are shown in Fig. 1, such adjustment of only the beaming angle causes the plow to gradually adjust itself again to a relatively shallow depth of soil penetration, but when it has reached its final position, as shown in full lines in Fig. 3, forward plow bottom 11 cuts a furrow of shallower depth than the rearward plow bottom. This is objectionable as above pointed out. The suction angle $\gamma''$ shown in Fig. 3 is also a departure from the theoretically correct angle $\gamma$ shown in Fig. 1 and results, as previously pointed out, in increased friction losses.

When the tractor is advanced with the plow in the full line position shown in Fig. 4, the vertical component of pull may be considered to be overbalanced by the vertical component of the draft, for the same reasons and under the same assumptions which have been discussed hereinbefore in connection with Figs. 2 and 3. The unbalanced portion of the vertical component of draft is compensated by the vertical pressure or reactive force of the plow upon the ground, and in the full line position of the plow shown in Fig. 4 wheel 15 presses downwardly upon the sole of the furrow formed by plow bottom 12 with sufficient force to maintain a furrow depth $g$ as the tractor advances.

By proper manipulation of screw rod 19 and of turnbuckle 8 the plow may be caused to run at any desired depth of soil penetration less than depth R, with plow points 27 and 28 and the lowest point on the circumference of wheel 15 aligned in a horizontal plane. That is, the plow may be caused to operate in a theoretically correct position affording equal furrow depths for both plow bottoms and a predetermined suction angle $\gamma$ for any selected depth of furrow equal to or less than the maximum depth designated R.

When the tractor is propelled with the plow in the ground at any desired furrow depth, the vertical component of pull reacts upon the tractor at the hitch axis 2 which is located forward of and below the rear wheel axis 3 of the tractor. As a result an appreciable load is imposed upon the rear wheels of the tractor in addition to that caused by the weight of the tractor when the tractor is operated to advance the plow in working position. When the vertical components of the pull and draft are balanced as has been assumed hereinbefore in connection with Fig. 1, wheel 15 of the plow exerts no material downward pressure upon the ground and the tractor becomes subject to an additional downward load in the nature of a moment produced by a force equal to the vertical component of pull acting vertically downward through the hitch axis on a lever arm equal to the horizontal distance the hitch axis is disposed in advance of the wheel axis. That is, at the maximum plowing depth a force equal to vertical component of draft acts downwardly on the tractor at the hitch axis 2, and the rear wheels are thus additionally loaded to effectively increase tractive effort when the tractor is subjected to the heaviest draft demand. When the plow is operated at a furrow depth which is shallower than the maximum furrow depth R, part of the vertical component of draft is compensated by the pressure of wheel 15 upon the ground as has been explained hereinbefore in connection with Figs. 2, 3, and 4, and a force smaller than the vertical component of the draft acts downwardly upon the tractor when the plow is operated at less than the maximum furrow depth R. That is, the additional load imparted to the rear wheels of the tractor decreases as the draft demand decreases.

One practical embodiment of a plow attachment mounted and operated in conformity with the principles discussed hereinbefore, and which incorporates features in addition to those disclosed in Figs. 1 to 4, is shown in Figs. 5 to 11.

Referring in the first instance to Figs. 5 and 6, it will be seen that apparatus embodying the invention comprises a conventional wheel type tractor (traveling support) generally indicated by reference character 40, a drawbar structure 41, a draft structure 42, a lift means 43, an implement support 44 operatively carrying two plow bottoms 45 and rolling coulters 46, a coupling means 47 operatively uniting draft structure 42 and support 44, and a depth regulating means 48 operatively connecting draft structure 42 and support 44.

Note, that for clarification the parts hereinbefore referred to in the description of the schematic drawings (Figs. 1 to 4) as a rigid draft assembly will hereinafter be referred to and comprise generally a drawbar structure and a draft structure in describing the embodiment shown in Figs. 6 to 11.

Tractor 40 includes a rear axle structure 49 mounting laterally spaced depending triangular brackets 51 having coaxial openings 52 at the lower vertex, aligned transversely in relation to the longitudinal axis of the tractor, for connection with drawbar structure 41 by pins 53, or other suitable means, as best seen in Fig. 6.

Drawbar structure 41 comprises (note Fig. 7) parallel side members 54 joined by a rear cross member 56 and by a forward cross member 57 to provide a rigid rectangular frame structure. A pair of members 58 extend forward from the forward cross member 57 in spaced adjacent parallel relation to side members 54, the forward end portion of members 54 and 58 are provided with coaxially aligned transverse openings 59 adapted for alignment with coaxial openings 52 in depending brackets 51. Frame 41 is hitched to the tractor by inserting pin 53, or similar means mounting the drawbar on brackets 51 for vertical swinging movement about said first transverse pivot axis, through the above mentioned aligned openings 59 and 52 on the drawbar structure and brackets respectively.

Draft structure 42 comprises pole part 61 and a vertical coupling post 62 journaled on a rear cylindrical portion 63 of draft pole 61 for circumferential movement thereabout. As best seen in Fig. 6 the draft pole is essentially a single longitudinal member having a hitch device on the forward end portion thereof for detachable connection with forward cross member 57. As shown, the hitch device comprises a bracket 64 rigidly fastened to the forward end of the draft pole and having a vertical upstanding flange 66 provided with a slot therein receiving a clamping member 67 pivotally secured to the top portion of pole 61 by means of a pin or the like 68, clamping member 67 being bent up slightly in relation to the draft pole. Forward cross member 57 is provided with a transverse series of spaced holes 69 and in this connection it should be noted that the base portion of bracket 64 and the overlying portion of clamping member 67 are provided with vertically aligned openings adapted to be selectively aligned with one of the holes 69 (see Fig. 7) in cross member 57 for detachably pivotally securing the draft pole thereto. This is accomplished by positioning the parts as shown in Figs. 6 and 7 and placing a suitable pin 70 through the aligned holes in bracket 64, cross member 57 and clamping member 67, whereupon the latter may be secured in firm side abutting relation against the top surface of cross member 57 by tightening bolt 71 which is retainably turnably mounted in a collar 65 extending through clamping member 67 and is adapted for threaded engagement with an underlying vertical hole in draft pole 61. The rear portion of draft pole 61 is provided with an upstanding bracket 72 terminating in a forwardly extending portion parallel to pole 61 and overlying rear cross member 56 of drawbar structure 41. Bracket 72 affords a means for support and laterally guided movement of pole 61 on cross member 56. In the illustrated embodiment coupling post 62 is journaled on draft pole 61 by sleeve 73 rigidly united on post 62. Sleeve 73 is positioned against longitudinal movement on pole 61 by stop collars 74 and 75 fixedly secured to pole 61 in end abutting relation to sleeve 73.

Collar 75 is provided with a laterally extending arm 76 having an apertured outer end pivotally receiving the lower end of a vertically extending rod 77, this rod having a threaded upper end connectably disposed within the lower end of an internally threaded tube 78, this tube extending upward through an aperture provided in a laterally extending portion of a bracket 79 carried by coupling post 62. Tube 78 is rotatably supported in bracket 79 by means of a bearing 81 carried by the latter and preventing longitudinal movement of tube 78 upon rotation thereof. Tube 78 is equipped with a crank handle 82 for rotation thereof and since tube 78 cannot move longitudinally and arm 76 is rigid the rotation of tube 78 effects a change in the distance between the connection on arm 76 and bracket 79 and results in a movement of sleeve 73 and coupling post 62 circumferentially with respect to the longitudinal axis of pole 61.

In order to maintain the drawbar 41 and draft structure 42 in position as a unit or to move this unit vertically about the pivot axis 55 (see Fig. 7) on the tractor, a lift means 43 is preferably mounted on the rear axle structure 49 of the tractor. This lift means comprises a pair of rock arms 83 having the rear ends 85 thereof pivotally connected with the opposite ends of a transversely extending, rigid bracket 87 carried by draft pole 61, intermediate the ends thereof, through means of flexible connectors, such as a pair of chains 84.

Implement support 44 (note Figs. 6 and 7) comprises generally parallel side members or beams 88 and 89, side member 88 having forward end portion 90 bent inward toward side member 89 and terminating in a foot portion 91 rigidly secured to side member 89 in parallel side abutting relation, a diagonal brace member 92 connecting the rear portion of side members 88 and 89, and a transverse shaft 93 rigidly uniting opposed forward end portions of side members 88 and 89. Shaft 93 extends through transversely aligned openings in bifurcated coupling post 62 thereby carrying implement support 44 thereon for pivotal movement about a joint having a transverse hinge axis coincident with the shaft. Beams 88 and 89 terminate in downwardly extending portions 94 and a conventional plow 45 is operatively mounted on each portion preferably in the relation shown in Figs. 6 and 7. Each plow may be considered as comprising a landslide 96, share 97 and moldboard 98. Attached to each beam is a rolling coulter 46 including as parts thereof a coulter blade 101 supported by a yoke assembly 102 pivoted about shank 103, such shank being secured to the plow beam forward of each plow unit by clamp plate 104.

Implement support 44 and coupling post 62 are rigidly united in selected angular relation through a coupling means 47 best seen in Figs. 6, 8, 9 and 10. Coupling means 47 comprises member 106 rigidly secured to diagonal bracing member 92, a threaded rod 107, a block 108 provided at one end with a notch-like recess 109 releasably connected with a transverse roller 110 carried by coupling post 62, said block having at its opposite end a threaded rodlike extension 111, and a turnbuckle 112 adjustably connecting threaded rods 107 and 111. Roller 110 is mounted transversely between the bifurcated portion of the coupling post 62 at a position above shaft 93 and below bracket 79. Recess 109 includes a fixed curved wall surface 113 (see Fig. 9) and a spaced opposed wall provided by a roller 117 carried by block 108, the relation of wall surface 113 and roller 117 being such that when block 108 is rigidly connected with coupling post 62, roller 110 is disposed in overcentering relation with respect to roller 117 so as to afford a latching effect. A third roller 118 is mounted on the coupling post 62 parallel to and above the first roller 110 and having opposite end portions 119 (see Figs. 8 and 10) of reduced diameter extending through and beyond aligned vertical slots 120 in coupling post 62. A pair of tension springs 121 connect the exposed reduced portions 119 of roller 118 with the upper ends of a pair of rods 122 having their lower ends detachably connected by bolts 123 with brackets or projections 124 carried by opposite sides of the coupling post 62. Springs 121 act to maintain roller 118 in engagement with the top of block member 108 to thereby prevent accidental disengagement thereof from roller 110.

Referring more generally to Fig. 6, it can be seen that the coupling means described afford a rigid connection between implement support 44 and coupling post 62 during normal operation of the plow. However, when the plow encounters an immovable object and the excessive strain is transferred from the plow to the coupling means 47, the block member 108 thereof tends to move forward and upward, and due to the coaction of the two rollers 110 and 117 the result is an upward force on roller 118 sufficient to compel tension springs 121 to yield permitting roller 118 to move upward in its slots 120 (see Fig. 9) and afford an opening in the coupling post for coupling means 47 to pass therethrough. Thus implement support 44 rotates counterclockwise (see Fig. 6) about shaft 93 on coupling post 62 and assumes the inoperative position shown in Fig. 11.

As previously mentioned the coupling means 47 is primarily designed to afford an adjustably rigid connection between support 44 and coupling post 62. By turning turnbuckle 112 the coupling means is lengthened or shortened and thereby the beaming angle between the coupling post 62 and support 44 is varied resulting in a change of the suction angle that the plow bottoms make with the ground surface.

Accordingly it should be apparent that the coupling or beaming means designated generally as 47 includes parts adjustably and releasably uniting the implement support and draft assembly for selective variation of the beaming angle and/or for the break back operation hereinbefore pointed out.

Referring to Fig. 6 it is seen that depth regulating means 48 for the plow unit comprises a supporting arm 131 having one end pivotally supported in a bearing structure 132 hereinbefore referred to as a second transverse pivot axis carried on landside 96 of the rear plow, a gauge wheel 133 rotatably mounted on the other end of supporting arm 131, an upwardly extending lift arm 134 having its lower end rigidly secured to arm 131 at a point between the landside and gauge wheel connections, and a rigid control member 137 having a first pivot connection between one end thereof and the upper end of lift arm 134, said connection affording relative movement about a third transverse pivot axis, and having its opposite end portion pivotally supported on the upper end of coupling post 62 for relative movement about a fourth transverse pivot axis. Control member 137 includes a first rod portion 139 pivotally connected with arm 134 and supporting a longitudinally aligned internally threaded sleeve 141, and a second rod portion 142 having one end portion disposed within sleeve 141 in threaded engagement therewith and having its opposite end portion supported on coupling post 62 through a conventional swivel mounting comprising a sleeve 147 rotatably supporting rod 142 and a pin 146 supporting sleeve 147 on coupling post 62 for pivotal movement about a transverse axis coincident with pin 146. Collars 148 are secured to rod 142 in end abutting relation to sleeve 147 and thereby prevent longitudinal movement of rod 142 with respect to sleeve 147 and post 62. The free end of rod 142 is provided with a crank handle 143, and by turning this handle rod 142 moves longitudinally relative to sleeve 141 causing a swinging movement of pivot 136 about pivot 146 resulting in an up and down movement of gauge wheel 133.

It will be apparent from the above description that an agricultural implement of the soil working type constructed in accordance with the invention affords a means for operating at a uniform predetermined depth while at the same time the implement and associated parts are permitted relative free movement with respect to the tractor. The depth regulating means is also arranged so that upon adjustment thereof, by means easily accessible to the driver while mounted, it will rapidly respond to such adjustment with a resulting change in the operating depth of the plows without further action by the operator. It will also be apparent that the apparatus affords easily accessible and precise means for adjustably securing the tool in any selected angular position in relation to the ground affording quick and uniform penetration of the soil, such means also cooperating with the depth regulating means for determining a selected working depth of the tool. In addition, the means securing the implement in selected angular position with respect to the ground includes a release lock connection affording break-back action of the implement upon striking an immovable object thereby reducing the damage and strain normally resulting from such accidents.

Furthermore, it may be seen from the above description the apparatus constructed in accordance with this invention provides means easily accessible to the driver for maintaining the implement in a position normal to the ground surface, a feature that is particularly desirable when the tractor is traveling over uneven ground. Also, the apparatus so constructed affords an easily operated means for vertically lifting the entire implement and draft unit about a point on the tractor to an inoperative position for traveling, turning in a small area or passing over an obstacle in the field.

Thus it will be apparent from the description that an apparatus constructed in accordance with the invention while simple in its construction and operation and inexpensive in its cost is extremely durable and insures uniform depth penetration in all types of soil.

It is claimed and desired to secure by Letters Patent:

1. An agricultural implement comprising a draft structure adapted for vertically rigid connection with an up and down adjustable tractor drawbar, an implement support, means connecting said implement support with said draft structure for angular movement relative thereto about a transverse hinge axis, a tillage tool connected with said implement support for movement in unison therewith, and coupling means rigidly interconnecting portions of said implement support and draft structure remote from said hinge axis and including an adjustable part effective to selectively change the angle between said implement support and draft structure while maintaining the rigidity of said interconnection, said coupling means also including additional parts interengaged for release in response to said tool encountering an excessive resistance while advancing in ground engaging position.

2. In combination a drawbar structure adapted for connection with a traveling support for movement relative thereto about a transverse pivot axis, a draft pole, hitch means securing said draft pole in longitudinally and vertically fixed relation to said drawbar structure for unitary swinging movement therewith about said axis, said hitch means holding said pole from turning about its longitudinal axis, an implement support secured to said draft pole for movement relative thereto about the longitudinal axis of said pole, and tilting means operatively connecting said implement support and draft pole for selectively shifting said implement support angularly about the longitudinal axis of said draft pole.

3. In a self-sustained traveling support, a drawbar structure for connection with a trailing agricultural implement, vehicle or the like and comprising a rigid frame structure having a forward end portion secured to said support for pivotal movement about an axis transverse with respect to the direction of travel, said frame structure including a rear cross member, a draft pole secured to the forward end portion of said frame structure for swinging movement about a vertical pivot axis, said pole extending rearward in proximate relation to said cross member and to a point therebeyond, a first means supporting a rear portion of said pole on said cross member for swinging movement therealong, a vertically extending coupling post supported on a rear end portion of said draft pole for angular movement relative to said pole about an axis coincident with the longitudinal axis thereof, said coupling post including a part for connecting a trailing device thereto, a second means operatively connecting said coupling post with said draft pole for selective angular shifting of said coupling post relative to said draft pole about the longitudinal axis of the latter, and a lift mechanism on said traveling support operably connected with said drawbar structure for raising and lowering said drawbar structure relative to said traveling support.

4. In a self-sustained traveling support, a drawbar structure for connection with a trailing agricultural implement, vehicle or the like and comprising a rigid frame structure having a forward end portion secured to said support for pivotal movement about an axis transverse with respect to the direction of travel, a draft pole, hitch means securing said draft pole to said frame structure for movement relative thereto about a vertical pivot axis and in unison therewith about said transverse pivot axis, said hitch means holding said draft pole from turning about its longitudinal axis, a vertically extending coupling post supported on a rear end portion of said draft pole for angular movement relative to said pole about the longitudinal axis of the latter, said coupling post including a part for connecting a trailing device thereto, and additional means operatively connecting said coupling post with said draft pole for selective angular shifting of said coupling post relative to said draft pole about the longitudinal axis of the latter.

5. For use with a tractor having a vertically swingable bail and means mounted on and normally permanently connected with the tractor for swinging said bail, the improvement which comprises an agricultural machine including a socket member having a forwardly facing opening adapted to receive the rear portion of said vertically swingable bail, and detachable connecting means carried by said socket member for connecting said socket member rigidly with said bail whereby vertical swinging of the latter acts to raise and lower said socket member.

6. For use with a mobile support having a vertically swingable member and means on said support and connected with said member for swinging the same, the improvement which comprises an implement adapted for detachable connection with said mobile support to be propelled thereby, a member-receiving part open at its forward portion to accommodate movement of said support and member into a position to engage the latter with said member-receiving part so as to be rigid therewith in a general vertical direction, means for pivotally connecting the implement to said part, a bracket on said part, an adjusting connection between said implement and said bracket for changing the position of the implement relative to said swingable member, and means on said member-receiving part for detachably locking the latter to said swingable member.

7. An implement adapted to be attached to a tractor having a substantially rigid bail member pivoted thereto and means on the tractor for swinging said bail, said implement comprising means serving as a frame, a bail-receiving socket member shaped to snugly receive the rear portion of said bail, means adjustably connecting said implement frame and bail-receiving member, means for holding the latter on said bail, and means for adjusting the position of said socket member and frame.

8. For use with a tractor having a vertically swingable drawbar and means on the tractor for swinging said drawbar, the improvement comprising an implement including a frame, a drawbar-receiving socket member adapted to be rigidly engaged with said drawbar, means for adjusting the position of the implement frame relative to said socket member, and means for holding the latter in rigid relation on said drawbar.

9. An agricultural implement adapted to be connected to a tractor having a drawbar and means for holding the drawbar in position, said implement comprising means serving as a frame, a drawbar-receiving member pivotally connected to the forward portion of said frame and adapted to receive said drawbar, and overload responsive means connected between said member and said implement frame means and serving normally to hold said drawbar-receiving member against movement relative to said frame.

10. An agricultural implement of the ground working type adapted to be connected to a tractor having a vertically swingable drawbar and means on the tractor for holding the drawbar in one or more given positions, said implement comprising a tool support having ground working tool means connected therewith, an attaching member pivotally connected with the forward portion of said support and so constructed and arranged as to receive and be rigidly connected with the rear portion of said tractor drawbar, an arm rigid with said attaching member, adjustable means extending between said arm and tool support for adjustably holding the latter in a given position with respect to said attaching member so that, when the latter is attached to the tractor drawbar, operation of said adjustable means will serve to adjust the depth of operation of said tool means, and releasable means for holding said attaching member on said drawbar.

11. For use with a tractor having a generally U-shaped bail pivotally connected for generally vertical swinging movement to the rear end of the tractor, the improvement comprising an implement having at its forward end a socket member adapted to receive the rear portion of said bail and to be rigidly held against generally vertical movement relative thereto, said implement including a section pivotally connected with said socket member, and means connected between said implement section and said socket member for controlling the movement of one relative to the other.

12. For use with a tractor having a vertically swingable drawbar and an arm rigid therewith, the improvement comprising an implement adapted to be pivotally connected with said drawbar, and means serving as a strut pivoted to the implement and adjustably connected with the outer end of said arm for holding said implement rigid with said tractor drawbar.

13. For use with a tractor having a vertically swingable bail, the improvement comprising an implement unit adapted to be detachably associated with said bail and including an implement frame, a member detachably connecting said implement frame to said bail and to which said implement frame is pivoted, an arm fixed to said member, and overload release means connected between said arm and said implement frame and arranged to restrain pivotal action between the implement frame and attaching member under normal loads.

14. For use with a tractor having a vertically swingable bail, the improvement comprising an implement unit detachably associated with said bail and including ground working tool means, a member adapted to be detachably connected with said bail, means pivotally connecting said tool means with said member, and overload release means normally rigid and connected at one end to said tool means and at the other end to said member and adapted to restrain pivoting action therebetween.

15. For use with a tractor having a vertically swingable bail, the improvement comprising an implement unit detachably associated with said bail and including ground working tool means, a member adapted to be detachably connected with said bail, means movably connecting said tool means with said member, and overload release means comprising a compressively rigid unit connected at one end to said tool means and at the other end to said member and adapted to restrain relative movement therebetween.

16. An agricultural implement of the ground working type adapted to be connected to a tractor having a vertically swingable drawbar and means on the tractor for holding the drawbar in one or more given positions, said implement comprising a tool support having ground working tool means connected therewith, an attaching member pivotally connected with the forward portion of said support and so constructed and arranged as to receive the rear portion of said tractor drawbar, an arm rigid with said attaching member, and adjustable means extending between said arm and tool support and including shiftable means movable for adjustably holding the latter in a given position with respect to said attaching member so that, when the latter is attached to the tractor drawbar, operation of said adjustable means will serve to adjust the depth of operation of said tool means.

17. For use with a mobile support having a vertically swingable member and means on said support disposed in overlying relation to said member for swinging same, the improvement which comprises an implement adapted for detachable connection with said mobile support to be propelled thereby, a member-receiving part having a forwardly facing portion open to accommodate movement of said support and member into a position to engage the latter with said member-receiving part so as to be rigid therewith in a generally vertical direction, means for pivotally and adjustably connecting the implement to said part, said last mentioned means including a bracket on said part and an adjusting connection between said implement and said bracket for changing the position of the implement relative to said swingable member, and means on said member-receiving part for detachably locking the latter to said swingable member.

18. In an agricultural machine the combination of a mobile support having a member vertically swingable about a transverse axis, an implement adapted for detachable connection with said mobile support to be propelled thereby, a member-receiving part having a forwardly facing portion open to accommodate movement of said support and member into a position to engage the latter with said member-receiving part so as to be rigid therewith in a generally vertical direction, means for pivotally and adjustably connecting the implement to said part, said last mentioned means including a bracket on said part and an adjusting connection between said implement and said bracket for changing the position of the implement relative to said swingable member, means on said member-receiving part for detachably locking the latter to said swingable member, and means on said support for swinging said implement and member as a unit about said transverse axis.

19. An agricultural implement of the ground working type adapted to be connected to a tractor having a vertically swingable drawbar, said implement comprising a tool support having ground working tool means connected therewith, an attaching member including a rigid arm portion pivotally connected with the forward portion of said support and so constructed and arranged as to receive the rear portion of said tractor drawbar, and adjustable means extending between said arm portion of said attaching member and said tool support and including shiftable means movable for adjustably holding the latter in a given position with respect to said attaching member so that, when the latter is attached to the tractor drawbar, operation of said adjustable means will serve to adjust the depth of operation of said tool means.

20. An agricultural implement adapted for use with a tractor having a drawbar and a lift means disposed in overlying relation to said drawbar comprising, a frame, a drawbar receiving member pivotally connected to a forward portion of said frame and adapted to receive said drawbar, and overload responsive means connected between said member and said frame and serving normally to prevent relative movement therebetween.

21. A mobile agriculural machine comprising: a draft assembly movable about a first transverse pivot axis; an implement support attached in trailing relation to said draft assembly for relative movement about a transverse hinge axis; a tillage tool connected with said implement support for movement in unison therewith; beaming means including parts adjustably uniting said draft assembly and said implement support for selectively varying and fixing the vertical angle therebetween whereby said draft assembly and implement support constitute a unit movable bodily about said first transverse pivot axis; a ground engaging gauge element connected with said unit for relative angular movement about a second transverse pivot axis spaced rearwardly from said first transverse pivot axis; and a rigid control member adjustable as to length and having a pivot connection with said gauge element and with said unit to afford limited vertical movement of said gauge element relative to said unit.

22. A mobile agricultural machine comprising: a draft assembly movable about a first transverse pivot axis; an implement support attached in trailing relation to said draft assembly for relative movement about a transverse hinge axis; a tillage tool connected with said implement support for movement in unison therewith; beaming means including parts adjustably uniting said draft assembly and said implement support for selectively varying and fixing the vertical angle therebetween whereby said draft assembly and implement support constitute a unit movable bodily about said first transverse pivot axis; a ground engaging gauge element connected with said unit for relative angular movement about a second transvesre pivot axis spaced rearwardly from said first transverse pivot axis; and a rigid control member adjustable as to length and having a pivot connection with said gauge element at a point adjacent said second transverse pivot axis and with said unit at a point adjacent said transverse hinge axis to afford limited vertical movement of said gauge element relative to said unit.

23. A mobile agricultural machine comprising: a draft assembly movable about a first transverse pivot axis; an implement support attached in trailing relation to said draft assembly for relative movement about a transverse hinge axis; a tillage tool connected with said implement support for movement in unison therewith; beaming means including parts adjustably uniting said draft assembly and said implement support for selectively varying and fixing the vertical angle therebetween whereby said draft assembly and implement support constitute a unit movable bodily about said first transverse pivot axis; a ground engaging gauge element connected with said unit for relative angular movement about a second transverse pivot axis spaced rearwardly from said first transverse pivot axis; and a rigid control member connected to said gauge element for pivotal movement relative thereto about a third transverse pivot axis parallel to and spaced above said second transverse pivot axis, said control member being supported on said unit for pivotal movement about a fourth transverse pivot axis in parallel vertically aligned relation to said transverse hinge axis, said control member being adjustable as to length to selectively vary the distance between said third and fourth transverse axes to afford limited vertical movement of said gauge element relative to said unit.

24. A mobile agricultural machine comprising: a draft assembly movable about a first transverse pivot axis; an implement support attached in trailing relation to said draft assembly for relative movement about a transverse hinge axis; a tillage tool connected with said implement support for movement in unison therewith; beaming means including parts adjustably uniting said draft assembly and said implement support for selectively varying and fixing the vertical angle therebetween whereby said draft assembly and implement support constitute a unit movable bodily about said first transverse pivot axis; a ground engaging gauge element connected with said unit for relative angular movement about a second transverse pivot axis spaced rearwardly from said first transverse pivot axis; and a rigid control member connected to said gauge element for pivotal movement relative thereto about a third transverse pivot axis parallel to and spaced upwardly from said second transverse pivot axis, said control member being supported on said unit for pivotal movement about a fourth transverse pivot axis positioned above said transverse hinge axis and intermediate said first and second transverse pivot axes, said control member being adjustable as to length to selectively vary the distance between said third and fourth transverse pivot axes to afford limited vertical movement of said gauge element relative to said unit.

25. A mobile agricultural machine comprising: a draft assembly movable about a first transverse pivot axis; an implement support attached in trailing relation to said draft assembly for relative movement about a transverse hinge axis; a tillage tool connected with said implement support for movement in unison therewith; beaming means including parts adjustably uniting said draft assembly and said implement support for selectively varying and fixing the vertical angle therebetween whereby said draft assembly and implement support constitute a unit movable bodily about said first transverse pivot axis, one of said parts being engaged with said unit for release in response to said tool encountering an immovable object while advancing in ground engaging position thereby permitting said implement support to move upwardly relative to said draft assembly about said transverse hinge axis; a ground engaging gauge element connected with said unit for relative angular movement about a second transverse pivot axis spaced rearwardly from said first transverse pivot axis; and a rigid control member adjustable as to length and having a pivot connection with said gauge element and with said unit to afford limited vertical movement of said gauge element relative to said unit as the length of said member is varied.

26. A mobile agricultural machine comprising a self-sustained traveling support; a drawbar structure carried by said traveling support for movement relative thereto about a first transverse pivot axis; a draft transmitting structure carried by said drawbar structure and forming therewith a draft assembly movable bodily about said first transverse pivot axis; an implement support attached in trailing relation to said draft transmitting structure for movement relative thereto about a transverse hinge axis; a tillage tool connected with said implement support for movement in unison therewith; beaming means including parts adjustably uniting said draft transmitting structure and said implement support for selectively varying and fixing the vertical angle therebetween whereby said implement support and draft assembly constitute a unit movable bodily about said first transverse pivot axis, one of said parts being engaged with said unit for release in response to said tool encountering an immovable object while advancing in ground engaging position thereby permitting said implement support to move upwardly relative to said draft transmitting structure about said hinge axis; a ground engaging gauge element connected with said unit for relative angular movement about a second transverse pivot axis spaced rearwardly from said first transverse pivot axis; a rigid control member adjustable as to length and having a pivot connection with said gauge element and with said unit to afford limited vertical movement of said gauge element relative to said unit as the length of said member is varied; and a lift mechanism on said traveling support operable from an implement lowered to an implement raised position and connected to said unit for swinging the latter bodily upward about said first transverse pivot axis, said lift mechanism in its implement lowered position affording substantially vertical movement of said unit relative to said traveling support about said first transverse pivot axis and being effective to limit downward swinging movement of said draft assembly upon said upward swinging movement of said implement support about said hinge axis.

27. A mobile agricultural machine comprising a self-sustained traveling support; a drawbar structure carried by said traveling support for movement relative thereto about a first transverse pivot axis; a draft transmitting structure carried by said drawbar structure for movement relative thereto about a vertical pivot axis and forming therewith a draft assembly movable bodily about said first transverse pivot axis; an implement support attached in trailing relation to said draft assembly for movement relative thereto about a transverse hinge axis; a tillage tool connected with said implement support for movement in unison therewith; beaming means adjustably uniting said draft assembly and said implement support for selectively varying and fixing the vertical angle therebetween whereby said draft assembly and implement support constitute a unit movable bodily about said first transverse pivot axis, a ground engaging gauge element connected with said unit for relative angular movement about a second transverse pivot axis spaced rearwardly from said first transverse pivot axis; and a rigid control member adjustable as to length and having a pivot connection with said gauge element and with said unit to afford limited vertical movement of said gauge element relative to said unit as the length of said member is varied.

28. A mobile agricultural machine comprising: a drawbar structure presenting attaching portions connectable with a traveling support for movement relative thereto about a transverse pivot axis; a draft transmitting structure carried by said drawbar structure and including a draft pole, a hitch means effecting a vertically rigid connection between said draft pole and said drawbar structure for movement of said draft pole about said transverse pivot axis, and a vertically extending coupling post supported on the rear portion of said draft pole for angular movement relative to said draft pole about an axis coincident with the longitudinal axis thereof; an implement support attached to said coupling post for relative movement about a transverse hinge axis; beaming means including parts attachably fixing the vertical angle between said coupling post and said implement support whereby said draft transmitting structure and implement support constitute a unit movable bodily about said transverse pivot axis; and means operatively connecting said coupling post with said draft pole for selective angular shifting of said implement support about the longitudinal axis of said draft pole.

29. A mobile agricultural machine comprising a draft transmitting structure having means thereon for effecting a vertically rigid connection between said structure and the drawbar of a propelled vehicle, said structure including a draft pole and a vertically extending coupling post supported on a rear portion of said draft pole for angular movement relative to said draft pole about an axis coincident with the longitudinal axis thereof; an implement support attached to said coupling post for relative movement about a transverse hinge axis; beaming means including parts adjustably fixing the vertical angle between said coupling post and said implement support whereby said coupling post and implement support constitute a unit movable bodily about said longitudinal axis; and means operatively connecting said coupling post with said draft pole for selective angular shifting of said implement support about the longitudinal axis of said draft pole.

30. A mobile agricultural machine comprising a self-sustained traveling support; a drawbar structure carried by said traveling support for movement relative thereto about a first transverse pivot axis; a draft transmitting structure carried by said drawbar structure for movement relative thereto about a vertical pivot axis and forming therewith a draft assembly movable bodily about said first transverse pivot axis; an implement support attached in trailing relation to said draft assembly for movement relative thereto about a transverse hinge axis; a tillage tool connected with said implement support for movement in unison therewith; beaming means including parts adjustably uniting said draft transmitting structure and said implement support for selectively varying and fixing the vertical angle therebetween whereby said draft assembly and implement support constitute a unit movable bodily about said first transverse pivot axis, one of said parts being engaged with said unit for release in response to said tool encountering an immovable object while advancing in ground engaging position thereby permitting said implement support to move upwardly relative to said draft assembly about said transverse hinge axis.

31. In a self-sustained traveling support, a draft assembly and a trailing agricultural implement comprising: a rigid frame structure having a forward end portion secured to said support for pivotal movement about an axis transverse with respect to the direction of travel, said frame structure including a rear cross member; a draft pole secured to the forward end portion of said frame structure for swinging movement about a vertical pivot axis, said pole extending rearward in proximate relation to said cross member and to a point therebeyond; means supporting a rear portion of said pole on said cross member for swinging movement therealong; a vertically extending coupling post supported on a rear end portion of said draft pole for selected angular adjustment relative to said pole about an axis coincident with the longitudinal axis thereof; an implement support attached in trailing relation to said coupling post for relative movement about a transverse hinge axis; a tillage tool connected with said implement support for movement in unison therewith; and beaming means including parts adjustably uniting said coupling post and said implement support for selectively varying and fixing the vertical angle therebetween whereby said rigid frame structure, draft pole, coupling post and implement support constitute a unit movable bodily about said first transverse pivot axis, said beaming means also including locking parts engaged for release in response to said tool encountering an immovable object while advancing in ground engaging position thereby permitting said implement support to move upwardly about said transverse hinge axis.

32. A mobile agricultural machine comprising a self-sustained traveling support; a drawbar structure carried by said traveling support for movement relative thereto about a first transverse pivot axis; a draft transmitting structure carried by said drawbar structure for limited lateral movement relative thereto and forming therewith a draft assembly movable bodily about said first transverse pivot axis; an implement support attached in trailing relation to said draft assembly for movement relative thereto about a transverse hinge axis; a tillage tool connected with said implement support for movement in unison therewith; beaming means including parts adjustably uniting said draft transmitting structure and said implement support for selectively varying and fixing the vertical angle therebetween whereby said draft assembly and implement support constitute a unit movable bodily about said first transverse pivot axis, one of said parts being angaged with said unit for release in response to said tool encountering an immovable object while advancing in ground engaging position thereby permitting said implement support to move upwardly relative to said draft assembly about said transverse hinge axis.

33. A mobile agricultural machine comprising a self-sustained traveling support; a drawbar structure carried by said traveling support for movement relative thereto about a first transverse pivot axis; a draft transmitting structure carried by said drawbar structure for limited lateral movement relative thereto and forming therewith a draft assembly movable bodily about said first transverse pivot axis; an implement support attached in trailing relation to said draft assembly for movement relative thereto about a transverse hinge axis; a tillage tool connected with said implement support for movement in unison therewith; beaming means including parts adjustably uniting said draft transmitting structure and said implement support for selectively varying and fixing the vertical angle therebetween whereby said draft assembly and implement support constitute a unit movable bodily about said first transverse pivot axis.

References Cited in the file of this patent

UNITED STATES PATENTS

| | | |
|---|---|---|
| 1,331,424 | Fanberg | Feb. 17, 1920 |
| 1,379,399 | Ferguson | May 24, 1921 |
| 1,381,041 | Warner | June 7, 1921 |
| 1,398,075 | Hartsough | Nov. 22, 1921 |
| 1,665,041 | Planess | Apr. 3, 1928 |
| 1,807,731 | Ehricke | June 2, 1931 |
| 1,990,731 | Greer | Feb. 12, 1935 |
| 2,005,555 | Morkovski | June 18, 1935 |
| 2,133,202 | Lantz | Oct. 11, 1938 |
| 2,160,350 | Bechman | May 30, 1939 |
| 2,247,534 | Von Schlegell | July 1, 1941 |
| 2,386,378 | Wippel | Oct. 9, 1945 |
| 2,414,114 | Martin | Jan. 14, 1947 |
| 2,483,565 | Strandlund | Oct. 4, 1949 |
| 2,604,834 | Silver et al. | July 29, 1952 |